United States Patent
Zirps

(10) Patent No.: US 11,114,918 B2
(45) Date of Patent: Sep. 7, 2021

(54) DIFFERENTIAL DRIVE

(71) Applicant: Corindus, Inc., Waltham, MA (US)

(72) Inventor: Christopher Zirps, Sharon, MA (US)

(73) Assignee: Corindus, Inc., Waltham, MA (US)

( * ) Notice: Subject to any disclaimer, the term of this patent is extended or adjusted under 35 U.S.C. 154(b) by 1989 days.

(21) Appl. No.: 14/315,961

(22) Filed: Jun. 26, 2014

(65) Prior Publication Data

US 2015/0001968 A1 Jan. 1, 2015

Related U.S. Application Data

(60) Provisional application No. 61/839,827, filed on Jun. 26, 2013.

(51) Int. Cl.
| | | |
|---|---|---|
| H02K 7/116 | (2006.01) | |
| A61F 11/00 | (2006.01) | |
| A61B 5/00 | (2006.01) | |
| H02K 7/10 | (2006.01) | |
| H02K 7/14 | (2006.01) | |
| H02K 16/00 | (2006.01) | |

(52) U.S. Cl.
CPC .......... *H02K 7/1004* (2013.01); *H02K 7/116* (2013.01); *H02K 7/14* (2013.01); *H02K 16/00* (2013.01); *H02K 2201/18* (2013.01)

(58) Field of Classification Search
CPC .......... A61B 17/2909; A61B 17/32002; A61B 2017/00017; A61B 2017/00115; A61B 2017/00398; A61B 2017/0042; A61B 2017/0046; A61B 2017/00464; A61B 2017/00473; A61B 2017/2903; A61B 2017/2905; A61B 2017/291; A61B 2017/2927; A61B 2017/320032; A61B 2090/0811; A61B 2560/0219; A61B 5/1112; A61B 5/7455; H02K 7/1004; H02K 7/14; H02K 16/00; H02K 2201/18
See application file for complete search history.

(56) References Cited

U.S. PATENT DOCUMENTS

| | | | |
|---|---|---|---|
| 6,096,004 A | 8/2000 | Meglan et al. | |
| 6,375,471 B1 | 4/2002 | Wendlandt et al. | |
| 6,726,675 B1 | 4/2004 | Beyar | |
| 7,927,310 B2 | 4/2011 | Bencteux | |
| 8,202,244 B2 | 6/2012 | Cohen et al. | |
| 2006/0146010 A1* | 7/2006 | Schneider .......... | A61M 25/0113 345/156 |
| 2010/0069833 A1* | 3/2010 | Wenderow ......... | A61M 25/0113 604/95.01 |

FOREIGN PATENT DOCUMENTS

EP 2567670 3/2013

* cited by examiner

*Primary Examiner* — Ann Schillinger

(57) ABSTRACT

A differential drive for manipulating an elongated device includes a drive mechanism configured to provide rotational and linear movement to the elongated percutaneous device. The drive mechanism including a platform rotatably supported by a support and a linear drive operatively coupled to the platform. A first motor operatively rotates the platform relative to the support and moving a portion of the linear drive relative to the platform. A second motor operatively rotates the platform relative to the support and moving a portion of the linear drive relative to the platform.

16 Claims, 8 Drawing Sheets

DIFFERENTIAL DRIVE

CROSS-REFERENCE TO RELATED PATENT APPLICATIONS

This application claims priority to US Provisional Application No. 61/839,827 filed on Jun. 26, 2013 entitled Differential Drive which is incorporated herein by reference in its entirety.

BACKGROUND OF THE INVENTION

Systems exist for the robotic feeding of percutaneous interventional devices such as guide wires and working catheters into guide catheters and procedures exist for the placement and seating of guide catheters such that their distal ends are adjacent the site of action for the intervention, typically a valve or chamber of the heart or a lesion in a blood vessel such as an artery. The guide catheter is typically placed by manual manipulation of medical personnel and its continued seating after placement assumed or determined by feel. The interventional devices such as guide wires and working catheters may be fed by the operation of robotic controls by medical personnel such as shown in U.S. Pat. No. 7,887,549.

SUMMARY OF THE INVENTION

A robotic drive includes a drive mechanism that utilizes two motors, where each motor provides both rotational and translational movement to an elongated percutaneous device such as a guide wire and/or working catheter. Each motor drives a first pair of pinch rollers and a second pair of pinch rollers, where the first and second pair of rollers are operatively connected.

In one embodiment A differential drive for manipulating an elongated device includes a drive mechanism configured to provide rotational and linear movement to the elongated percutaneous device. The drive mechanism including a platform rotatably supported by a support and a linear drive operatively coupled to the platform. A first motor operatively rotates the platform relative to the support and moving a portion of the linear drive relative to the platform. A second motor operatively rotates the platform relative to the support and moving a portion of the linear drive relative to the platform.

In another embodiment a method of manipulating an elongated percutaneous device includes providing a differential drive including a first motor and a second motor, wherein the elongated percutaneous device is rotated about and driven along its elongated axis as a function of the difference between the rotational speed and direction of the first motor and the second motor.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION OF THE PREFERRED EMBODIMENTS

An embodiment involves mapping the path to be followed in deploying a percutaneous intervention device at its site of action. One approach involves deploying a guide catheter in the conventional manner, i.e. manually, and then feeding a guide wire through the guide catheter and measuring its apparent travel path in two-dimensional fluoroscopic images. This may be combined with measurements about the length of guide wire fed into the guide catheter and a general map of the artery system in which the guide catheter is deployed to render a three dimensional map of the path which includes travel in the z direction relative to the two dimensional fluoroscopic images.

Figure 1:
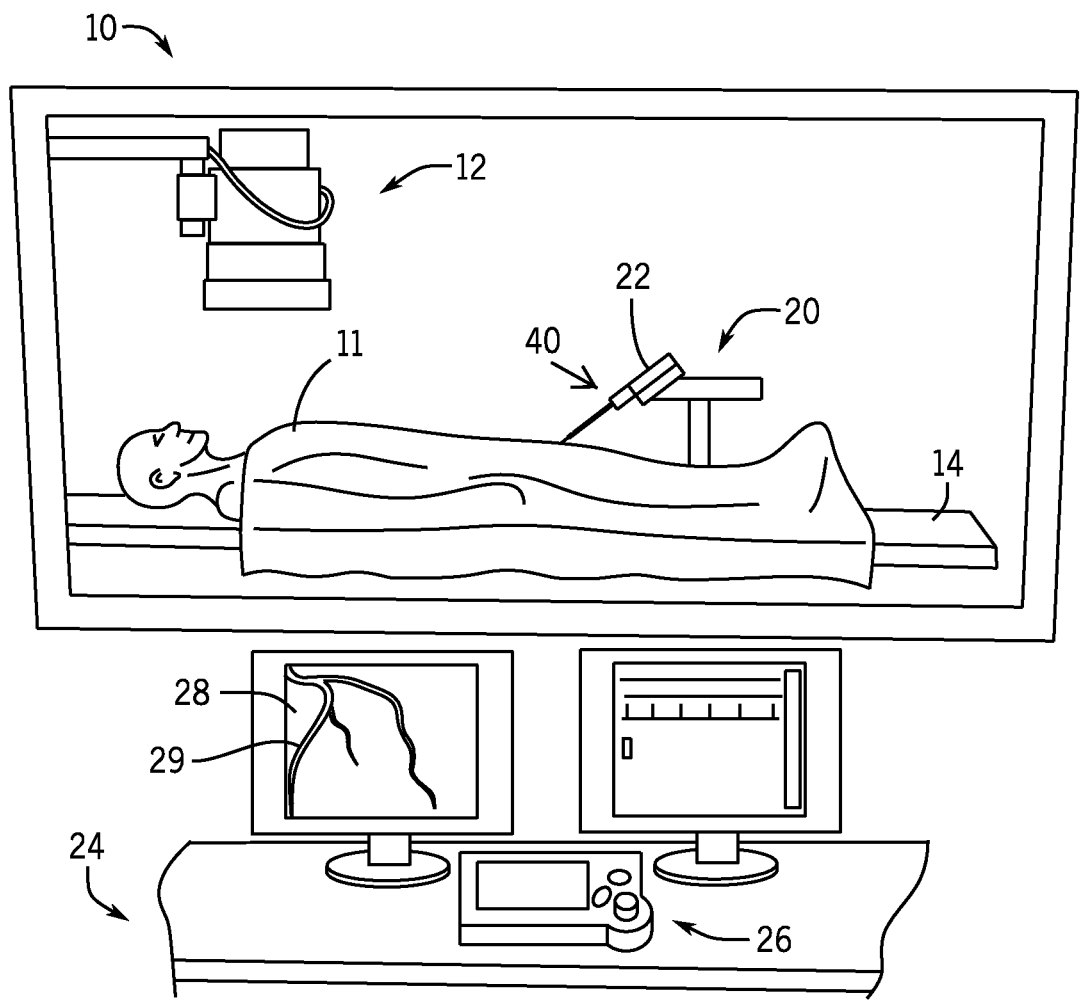
FIG. 1 is a schematic of the environment in which percutaneous interventional procedures are robotically performed.

FIG. 1 shows the environment in which the various embodiments of the present invention find particular utility. It shows a catheter laboratory 10 for robotically performing percutaneous interventional procedures. A patient 11 is supported on a table 14 and the procedure is observed with X-ray equipment 12. A cassette 22 supported by a robotic arm 20 is used to automatically feed a guide wire 30 (shown in FIG. 2) into a guide catheter 32 seated in an artery of the patient 11. The cassette 22 is controlled from a remote station 24 in order to isolate the medical personnel conducting the procedure from exposure to the X-ray radiation used to monitor the procedure by use of fluoroscopic equipment. The station includes remote controls 26 for controlling the cassette 22 and a screen 28 with which to monitor the progress of the procedure. It displays the arterial system 29 being addressed by the procedure. U.S. Pat. No. 7,887,549, incorporated herein by reference, has a detailed disclosure of this environment.

Figure 2:
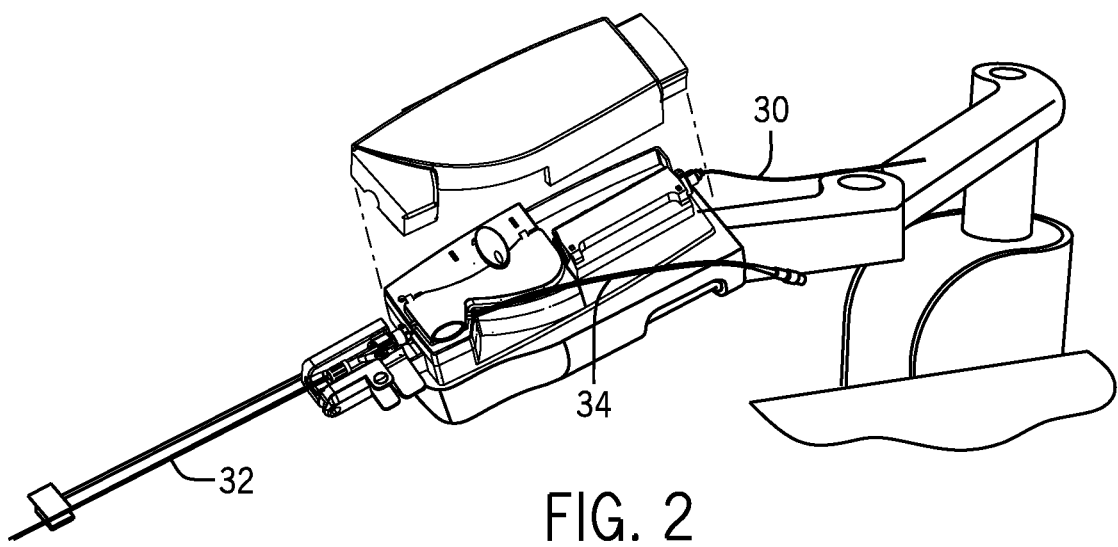
FIG. 2 is a close up of a robotic cassette supported by an arm.

Referring to FIG. 2 cassette 22 drives guide wire 30 and/or a working catheter 34 such as a balloon and/or stent catheter through a guide catheter 32. A drive mechanism is housed in cassette 22 that provides translational and/or rotational movement to the guide wire and/or working catheter.

Figure 3:
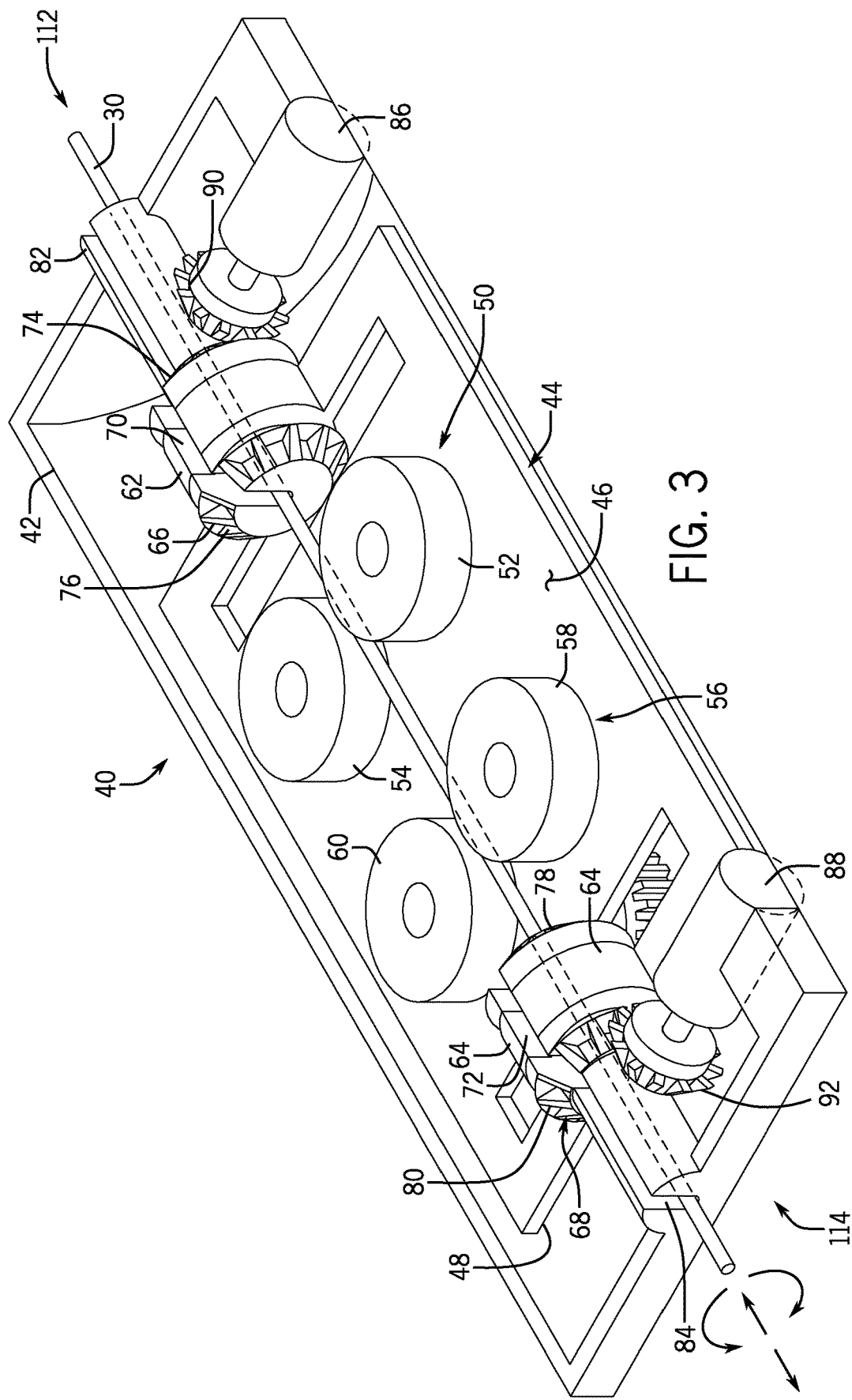
FIG. 3 is an isometric top view of a drive mechanism.

Referring to FIG. 3 drive mechanism 40 includes a support 42 that rotatably supports platform 44. Platform 44 includes a top surface 46 and an opposing lower surface 48. A first pair of roller wheels 50 are rotatably supported on the top surface 46 of platform 44. The first pair of roller wheels 50 include a drive wheel 52 and a driven or idle wheel 54. Each of the wheels rotate about its center axis that may be supported by a center axle. Similarly a second pair of roller wheels 56 include a drive wheel 58 and a driven or idle wheel 60. Each of the wheels 58, 60 rotate about its center axis that may be supported by a center axle.

Platform 44 further includes a first journal 62 and a second journal 64 that respectively supports a first gear 66 and a second gear 68. First gear 66 rotates within first journal 62 and second gear 68 rotates within second journal 64. First journal 62 and first gear 66 include a slot 70 that extends from a center axis of gear 66 to an outer periphery of first gear 66 and an outer periphery of first journal 62. When first gear 66 is rotated such that the slot within the first gear is aligned with the slot in the first journal it is possible to place a guide wire through the slot to the bottom of the slot of the first gear. Similarly, second journal 64 and second gear 68 include a slot 72 that extends from a center axis of second gear 68 to an outer periphery of second gear 68 and an outer periphery of second journal 64. When second gear 68 is rotated such that the slot within the second gear 68 is aligned with the slot in the second journal 64 it is possible to place a guide wire through the slot to the bottom of the slot of the second gear. First gear 66 includes a first beveled gear portion 74 and an opposing beveled gear portion 76. Similarly second gear 68 includes a beveled gear portion 78 and an opposing beveled gear portion 80.

Support 42 includes a first slot 82 and a second slot 84, each having a bottom portion that allows guide wire to have lie in a straight line within drive mechanism 40. A first motor 86 and a second motor 88 are operatively connected to first gear 66 and second gear 68 respectively. First motor 86 and second motor 88 in one embodiment are in a fixed relationship to base 42 and do not rotate along with platform 44. First motor 86 drives a gear 90 that meshes with and drives beveled gear portion 74 of first gear 66. Similarly, second motor 88 drives a gear 92 that meshes with and drives beveled gear portion 80 of second gear 68.

Figure 5A:
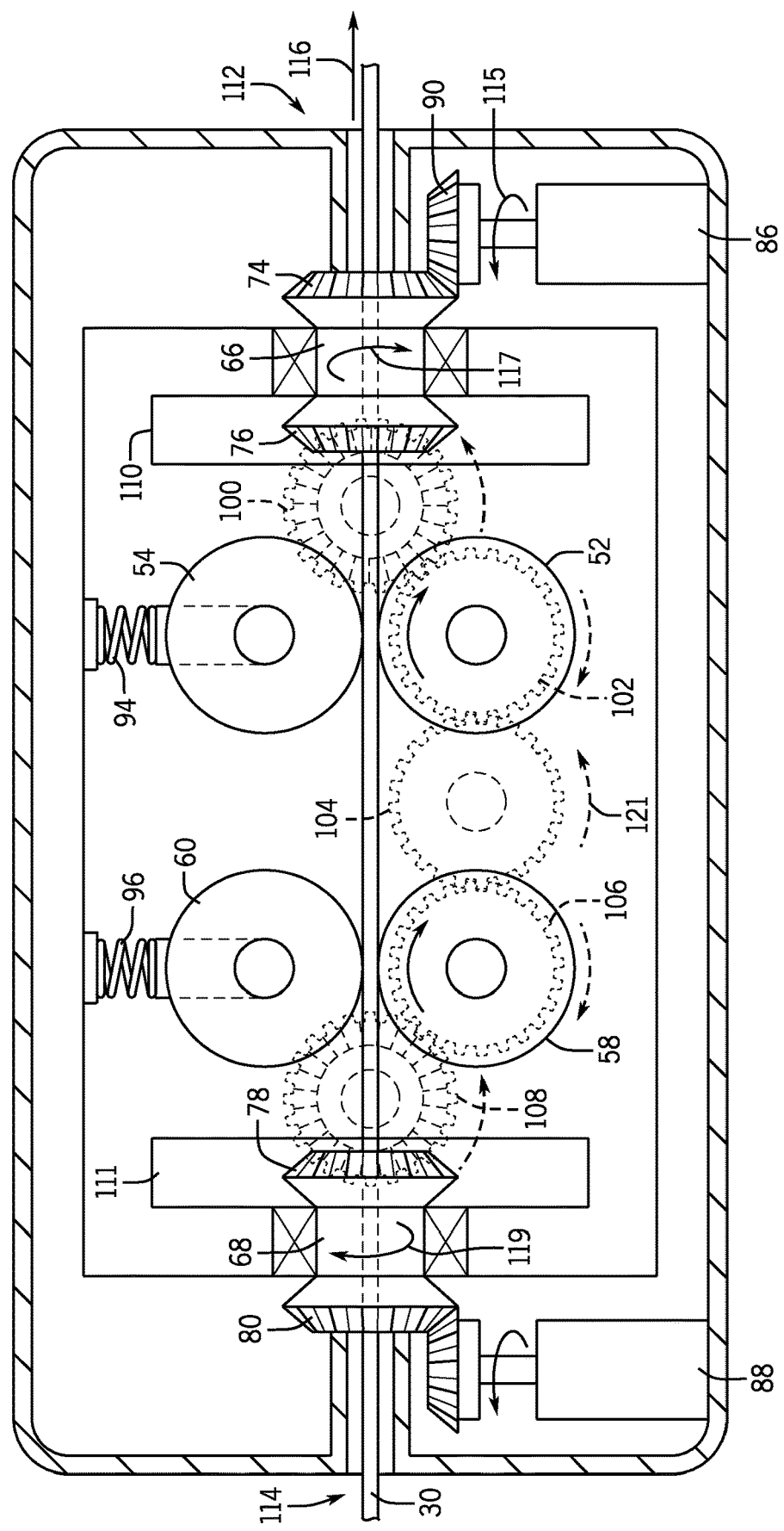
FIG. 5A is a top view of the drive mechanism of FIG. 3 with both motors rotating clockwise.

Referring to FIG. 3 and FIG. 5A, each of first idle wheel 54 and second idle wheel 60 are biased toward first drive wheel 52 and second drive wheel 58 respectively. In one embodiment a first spring 94 and second spring 96 bias first idle wheel 54 and second idle wheel 60 respectively toward first drive wheel 52 and second drive wheel 58 respectively. In other embodiments the idle wheels may be moved a fixed or variable distance toward the drive wheels to provide the desired force between the wheels and guide wire 30.

Figure 4:
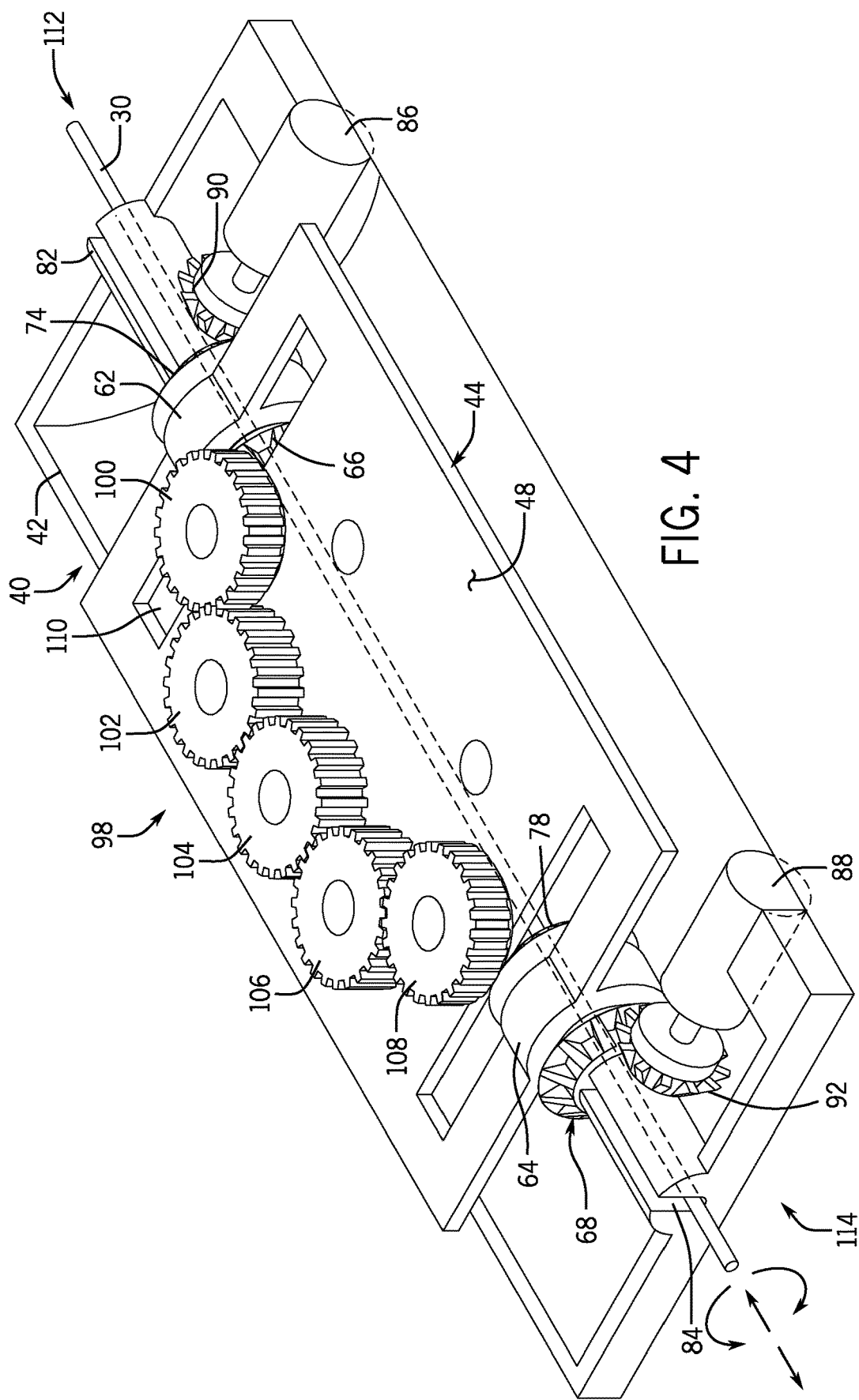
FIG. 4 is an isometric bottom view of the drive mechanism of FIG. 3.

Referring to FIG. 4 gear train 98 includes a first gear 100 that is driven by bevel portion 74 of first gear 66. Note that a portion of the outer periphery of bevel portion 74 extends through an opening 110 in platform 44. Gear 100 engages gear 102 which pivots along with first drive wheel 52 such that wheel 52 rotates along with the rotation of gear 102. A common shaft may connect gear 102 with wheel 52, where the shaft extends through platform 44. Gear 102 engages gear 104 which in turn engages gear 106. Gear 106 pivots along with second drive wheel 58 such that wheel 58 rotates along with rotation of gear 106. A common shaft may connect gear 106 with wheel 58, where the shaft extends through platform 44. Gear 106 engages gear 108 which in turn engages beveled portion 78 of second bevel gear 68.

The operation of drive mechanism 40 will now be described. Referring to FIG. 5A drive mechanism 40 includes a proximal end 112 and a distal end 114. The proximal end 112 is the region that is located furthest from the patient in an in use orientation, while distal end 114 is located closer to the patient than the proximal end when the drive mechanism is in the in use position. Stated another way, as guide wire 30 is moved from proximal end 112 toward the distal end 114 guide wire 30 is being advanced into the patient and when guide wire 30 is moved from distal end 114 toward proximal end 112, guide wire is being retracted or withdrawn from the patient. Referring to FIG. 5A, in order to clarify directions used to describe the rotational motion of the gears of drive mechanism 40 a right hand rule will be employed such that rotational vector 115 is in a counterclockwise direction, rotational vector 117 is in a counterclockwise direction, while rotational vector 119 and rotational vector 121 are in clockwise directions.

Referring to FIG. 5A in a first mode of operation first motor 86 drives gear 90 in a first direction shown as counterclockwise and second motor 88 drives gear 92 in the same first counterclockwise direction. Beveled gear 90 engages first beveled gear portion 74 of first beveled gear 66 which rotates beveled gear 66 is rotated in a counterclockwise direction. Beveled gear 66 rotates gear 100 in a counterclockwise direction which rotates gear 102 and drive wheel 52 in a clockwise direction. Similarly, second motor 88 rotates second beveled gear 68 in a clockwise direction which in turn rotates gear 108 in a counterclockwise direction which rotates gear 106 and drive wheel 58 in a clockwise direction. Note that both drive wheel 52 and drive wheel 58 are rotated in the same direction. Since gear 104 is engaged with gear 102 and gear 106, drive wheel 52 and drive wheel 58 both rotate at the same speed and in the same direction. As described above, when the first motor 86 and the second motor 88 drive gears 90 and 92 respectively in a counterclockwise direction at the same speed the result is that guide wire 30 is retracted or moved along a vector direction 116 from distal end toward proximal end 112. Note that idle wheels 54 and 60 rotate in a direction opposite to drive wheel 52 and drive wheel 58 respectively.

Figure 5B:
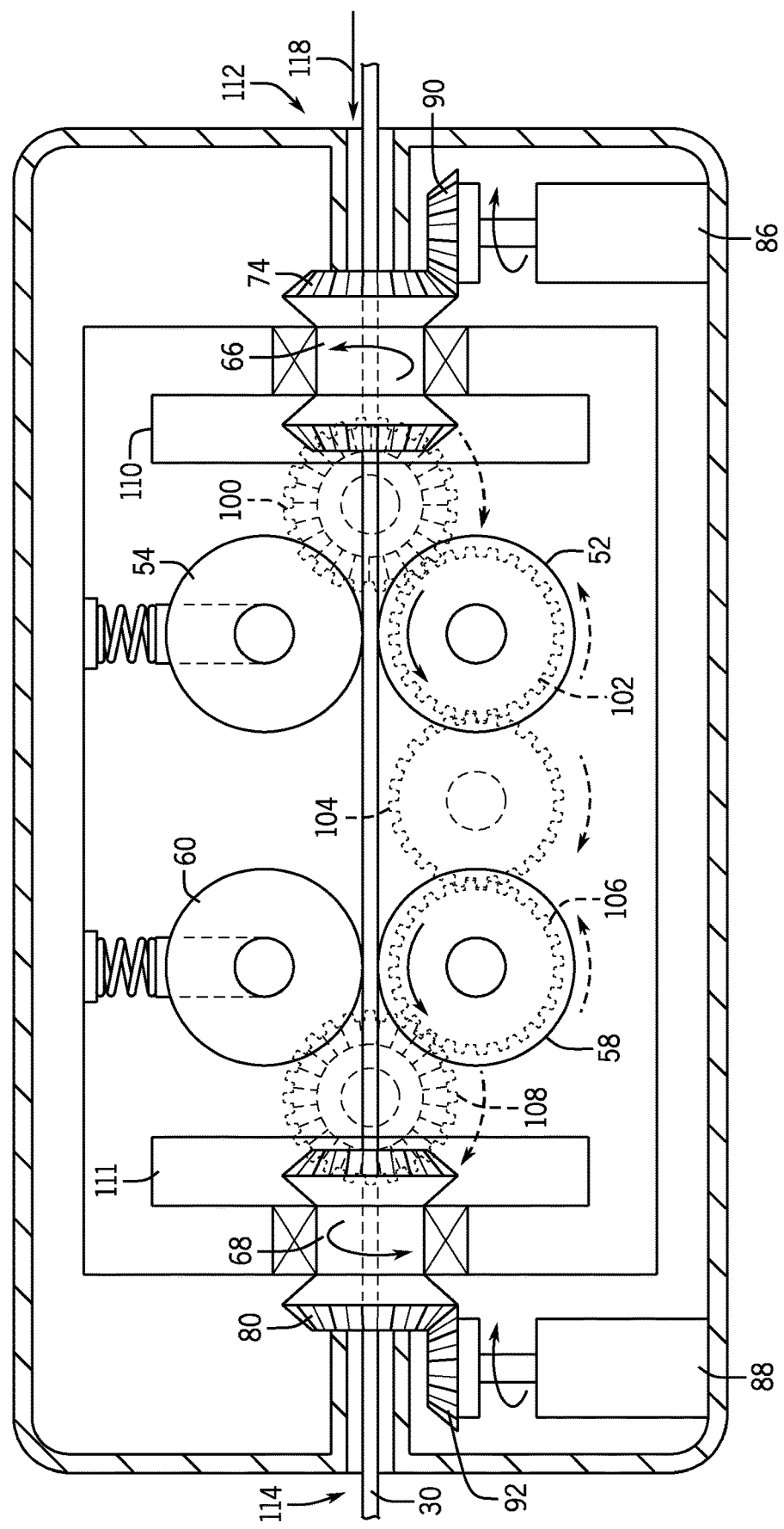
FIG. 5B is a top view of the drive mechanism of FIG. 3 with one motor rotating clockwise and the second motor rotating counterclockwise

Referring now to FIG. 5B the operation of drive mechanism 40 will be described in a second mode of operation where first motor 86 rotates gear 90 in a clockwise direction and second motor 88 drives gear 92 in the same clockwise direction. Beveled gear 90 engages first beveled gear portion 74 of first beveled gear 66 which rotates beveled gear 66 is rotated in a clockwise direction. Beveled gear 66 rotates gear 100 in a clockwise direction which rotates gear 102 and drive wheel 52 in a counterclockwise direction. Similarly, second motor 88 drives gear 92 in a clockwise direction which rotates second beveled gear 68 is rotated in a counterclockwise direction which in turn rotates gear 108 in a clockwise direction which rotates gear 106 and drive wheel 58 in a counterclockwise direction. Note that both drive wheel 52 and drive wheel 58 are rotated in the same direction. Since gear 104 is engaged with gear 102 and gear 106, drive wheel 52 and drive wheel 58 both rotate at the same speed and in the same direction. As described above, when the first motor 86 and the second motor 88 both rotate gears 90 and 92 respectively in a clockwise direction at the same speed the result is that guide wire 30 is advanced or moved along a vector direction 118 from proximal end 112 toward distal end 114. Note that idle wheels 54 and 60 rotate in a direction opposite to drive wheel 52 and drive wheel 58 respectively.

When first motor 86 and second motor 88 rotate gears 90 and 92 respectively in the same direction and at the same speed platform 44 does not rotate about its axis. The only motion imparted to guide wire 30 is to translate the guide wire 30 along its axis either to advance or retract the guide wire as discussed above. Referring to FIGS. 5A and 5B beveled gears 66 and 68 are rotating in opposite directions. Where the speed of beveled gears 66 and 68 is the same, albeit in different directions, platform 44 does not rotate. In the first two modes of operation illustrated in FIG. 5A and FIG. 5B, guide wire 30 is translated about its axis but it is not rotated about its axis. However, it is also possible to rotate platform 44 thereby resulting in the rotation of guide wire 30 about its axis in either a clockwise or counterclockwise direction.

Figure 5C:
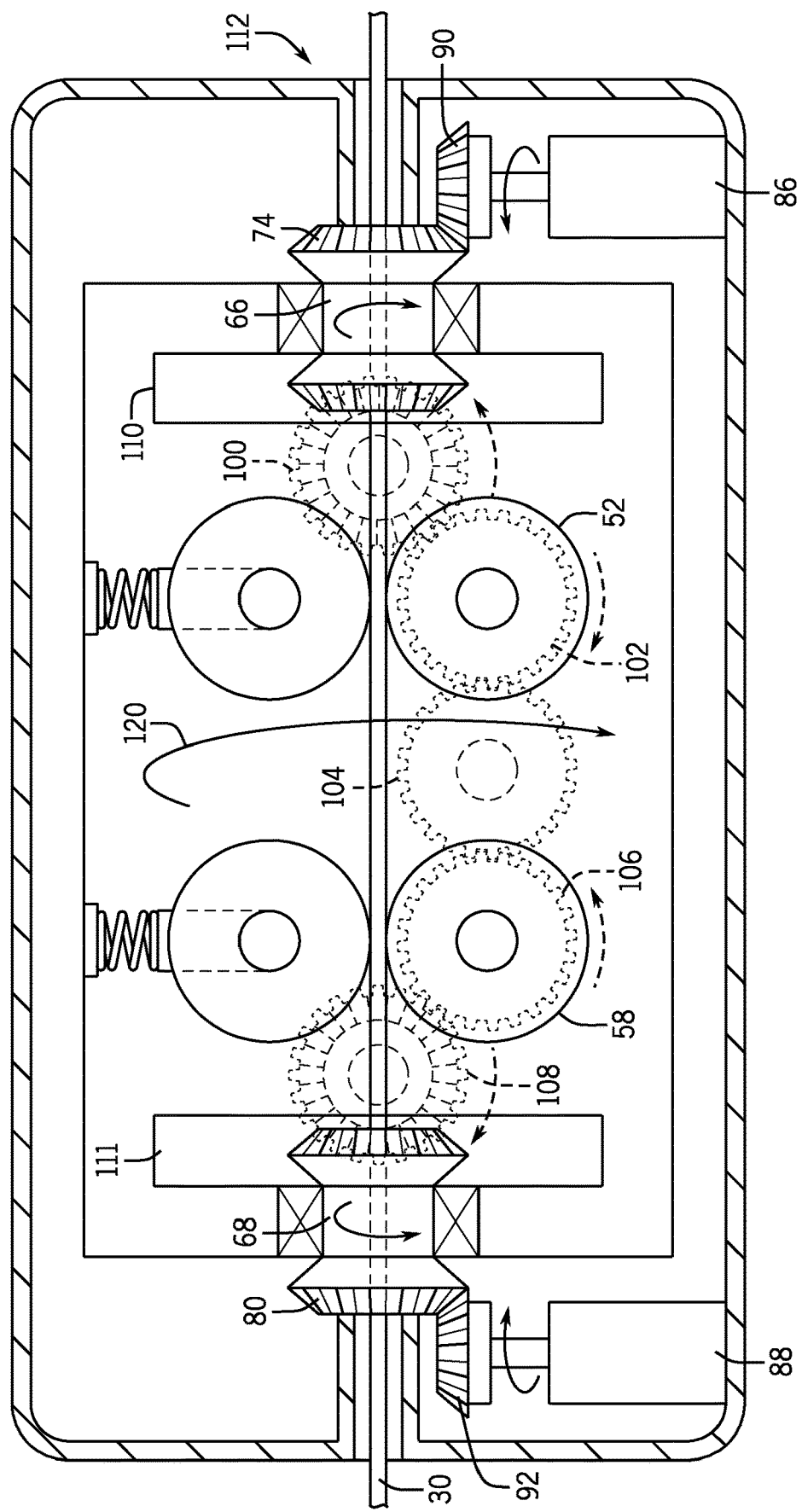
FIG. 5C is a top view of the drive mechanism of FIG. 3 with a first motor rotating clockwise and the second motor rotating counterclockwise.

Referring to FIG. 5C the operation of drive mechanism 40 will be described in a third mode of operation that results in rotation of platform 44 and guide wire 30 in a counterclockwise direction. In this third mode of operation first motor 86 drives gear 90 counterclockwise, while second motor 88 drives gear 92 clockwise. Gear 90 drives first beveled gear 66 in a counterclockwise direction, while gear 92 drives second beveled gear 68 in the same counterclockwise direction as first beveled gear 66. Following the gear train, first beveled gear 66 drives gear 100 in a counterclockwise direction which drives gear 102 and first wheel 52 in a clockwise direction. However, since second beveled gear 68 drives gear 108 in a clockwise direction which drives gear 106 and second wheel 58 in a counterclockwise position, the forces of gear 102 and gear 106 cancel each other out resulting in no movement of first wheel 52 and second wheel 58. Note that gear 102 and gear 106 are connected via gear 104. Since the rotation of gears 102 and 106 are equal and opposite in this third mode of operation first wheel 52 and second wheel 58 do not rotate. As a result guide wire 30 is not translated along its axis. In this mode however, platform 44 rotates in the counterclockwise direction 120. Since wheels 54 and 60 pinch guide wire 30 against wheels 52 and 58 respectively guide wire will rotate about its axis as platform 44 rotates about its axis.

Figure 5D:
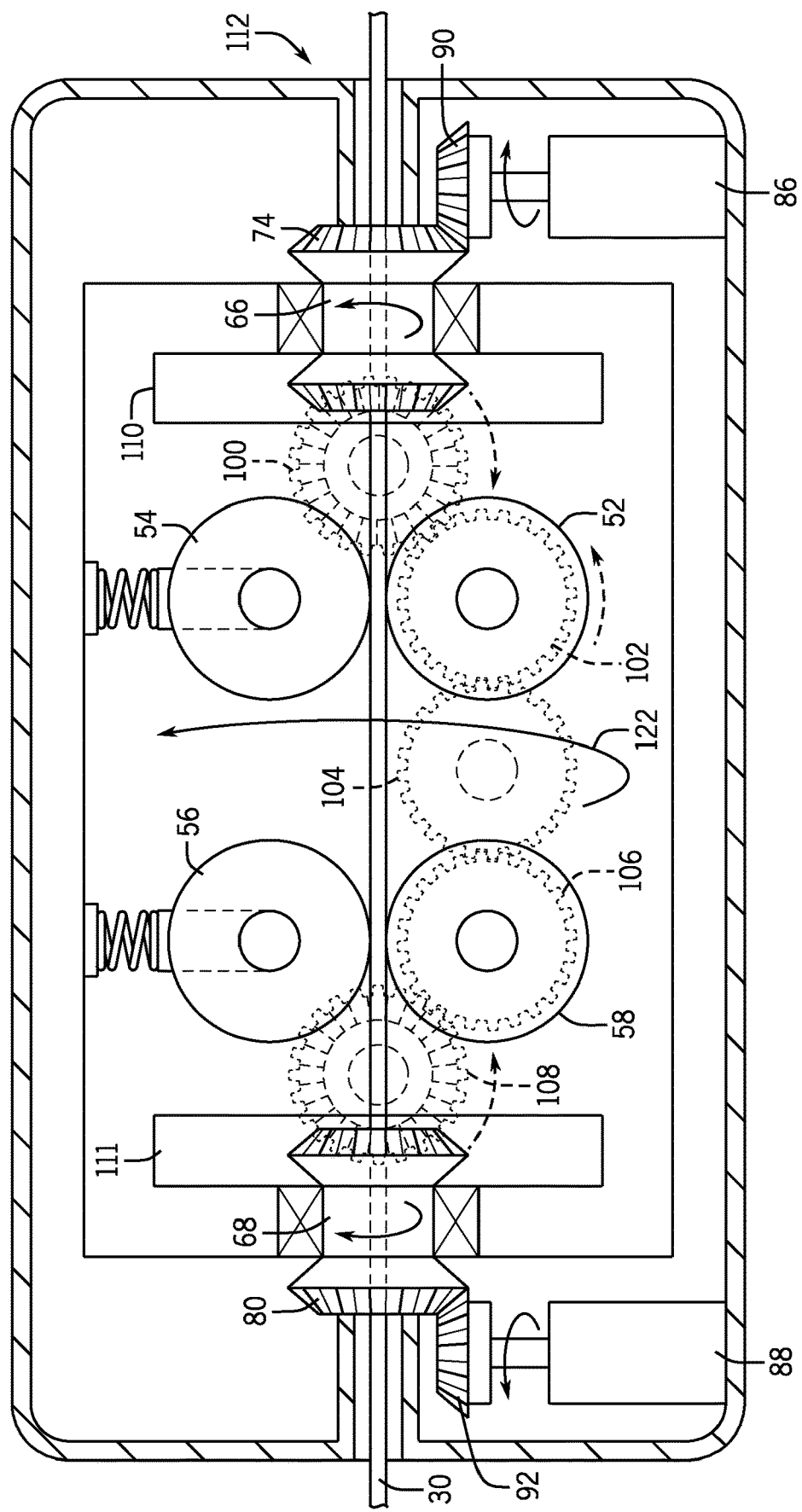
FIG. 5D is a top view of the drive mechanism of FIG. 3 with a first motor rotating counterclockwise and the second motor rotating clockwise.

Referring to FIG. 5D a fourth mode of operation of drive mechanism 40 will be described that results in rotation of platform 44 and guide wire 30 in a clockwise orientation. In this fourth mode of operation first motor 86 drives gear 90 clockwise, while second motor 88 drives gear 92 counterclockwise. Gear 90 drives first beveled gear 66 in a clockwise direction, while gear 92 drives second beveled gear 68 in the same clockwise direction as first beveled gear 66. Following the gear train, first beveled gear 66 drives gear 100 in a clockwise direction which drives gear 102 and first wheel 52 in a counterclockwise direction. However, since second beveled gear 68 drives gear 108 in a clockwise direction which drives gear 106 and second wheel 58 in a clockwise direction, the forces of gear 102 and gear 106 cancel each other out resulting in no movement of first wheel 52 and second wheel 58. Note that gear 102 and gear 106 are connected via gear 104. Since the rotation of gears 102 and 106 are equal and opposite in this fourth mode of operation first wheel 52 and second wheel 58 do not rotate. As a result guide wire 30 is not translated along its axis. In this mode however, platform 44 rotates in the clockwise direction 122. Since wheels 54 and 60 pinch guide wire 30 against wheels 52 and 58 respectively guide wire will rotate about its axis as platform 44 rotates about its axis.

All four modes of operation discussed above include motors 86 and 88 providing rotation of gears 90 and 92 respectively at the same speed albeit in different combination of the same and different directions. However, if motors 86 and 88 rotate gears 90 and 92 at different speeds, then the result will be that platform 44 will rotate and wheels 52 and 58 will rotate resulting in drive wire 30 both being rotated about its axis and being axially driven along its axis.

The direction of rotation and direction that the wheels 52 and 58 drive the guide wire 30 depends on the relative speeds and directions that motors 86 and 88 drive gears 90 and 92 respectively. By way of example if motor 86 rotates drive gear 90 in a clockwise direction and motor 88 does not rotate gear 92 at all, then guide wire 30 will rotate clockwise about its axis and will be driven longitudinally in a direction toward the distal end away from the proximal end to advance the guide wire along its axis. The opposite will occur if motor 86 rotates drive gear 90 in a counterclockwise direction and motor 88 does not rotate gear at all. Specifically guide wire 30 will rotate counterclockwise about its axis and will be driven longitudinally in a direction toward the proximal end and away from the distal end to retract the guide wire along its axis.

Similarly, if motor 88 rotates drive gear 92 in a clockwise direction and motor 86 does not rotate gear 90 at all, then guide wire 30 will rotate clockwise about its axis and will be driven longitudinally in a direction toward the distal end away from the proximal end to advance the guide wire along its axis. The opposite will occur if motor 88 rotates drive gear 92 in a counterclockwise direction and motor 86 does not rotate gear 90 at all. Specifically guide wire 30 will rotate counterclockwise about its axis and will be driven longitudinally in a direction toward the proximal end and away from the distal end to retract the guide wire along its axis.

Turning now to the situation in which both motors 86 and 88 rotate gears 90 and 92 at different rates, then the difference will result in rotation and advance/retract of the guide wire at different rates. That is by modifying the different rates of rotation of gears 90 and 92 it is possible to vary the rate of rotation of guide wire 30 and vary the rate that guide wire 30 advance or retracts along its axis. A user may control the relative rotational rates of gears 90 and 92 as well as the direction of rotation to control the rate and direction of rotation of guide wire 30 and the rate and direction that guide wire 30 is translated along its axis. The differing rates of motors 86 and 88 are handled by the differential drive aspect of drive mechanism 40. The drive mechanism accommodates the differing rates and direction of the first motor and the second motor to produce a resultant linear and rotational drive of the elongated percutaneous device along and about its longitudinal axis that is a function of the speed and direction of both the first motor and the second motor.

Figure 6:
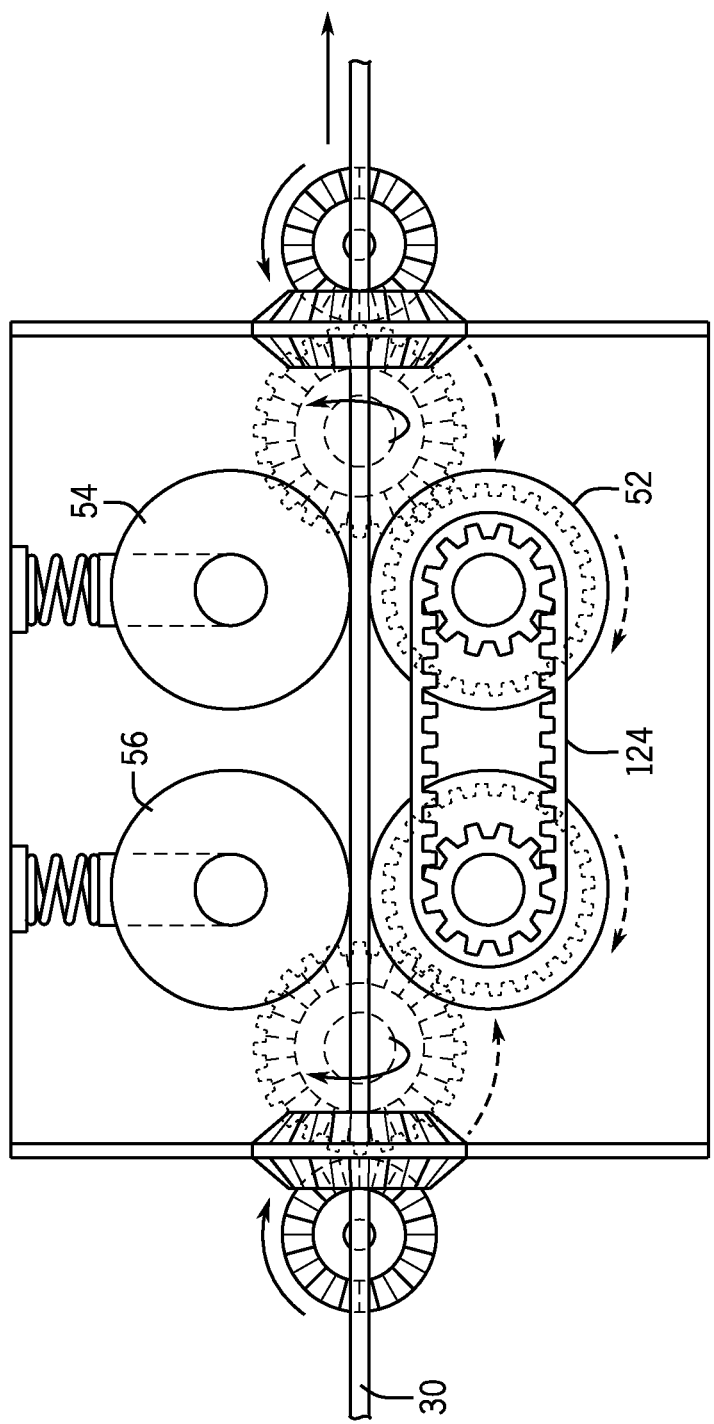
FIG. 6 is a bottom view of the drive mechanism of FIG. 3 with a belt connecting the two drive wheels.

Referring to FIG. 6 a belt 124 may be used instead of gear 104 to couple gears 106 and 102 thereby ensuring that wheels 52 and 58 rotate at the same rate.

While in one preferred embodiment drive mechanism 40 is used to rotate and/or translate a guide wire, drive mechanism 40 may also be used to rotate and/or translate a working catheter and/or a guide catheter. It is also contemplated that cassette 22 may include more than one drive mechanism 40 to drive more than one of a guide wire, working catheter and/or guide catheter. The drive mechanisms 40 may be placed serially, in parallel or some angled orientation to one another to rotate and/or translate a guide wire, working catheter and/or guide catheter simultaneously.

In one embodiment motors are secured to support 42. In another embodiment support 42 and platform form a disposable assembly that is removably secured to a base that houses the first motor and the second motor. In one embodiment the disposable assembly is in the form of a cassette that is removably coupled to a base having the drive motors. In one embodiment the first and second drive motors are controlled by a controller which may be located remotely from the disposable assembly, cassette and/or base.

The term rotation of motors or the rotation of a motor may be used to describe the rotation of an output shaft and/or rotation of a gear (90, 92) directly attached to an output shaft of the motor or motors. Similarly, the speed of the motor or motors is used to describe the speed of the rotation of the output shaft and/or rotation of a gear (90, 92) directly attached to an output shaft of the motor or motors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A differential drive for manipulating an elongated percutaneous device comprising:
    a drive mechanism configured to provide rotational and linear movement to the elongated percutaneous device, the drive mechanism including a unitary platform rotatably supported by a support and a linear drive operatively coupled to the unitary platform;
    a first motor operatively rotating the unitary platform relative to the support and moving a portion of the linear drive relative to the unitary platform;
    a second motor operatively rotating the unitary platform relative to the support and moving a portion of the linear drive relative to the unitary platform, wherein the unitary platform operatively rotated by the first motor is the same unitary platform operatively rotated by second motor; wherein the linear drive includes at least one drive member operatively connected to the first motor and the second motor; the linear drive includes at least one pair of a drive member and a driven member biased toward the drive member, where the elongated percutaneous device is positioned between the drive member and the driven member; and the drive member is a roller wheel operatively connected to a gear in a gear chain operatively coupled to the first motor and to the second motor.

2. The apparatus of claim 1, wherein the drive mechanism is a differential drive, a direction and speed of rotation of the elongated percutaneous device about its longitudinal axis is determined by a direction of rotation and speed of rotation of the first motor and a direction of rotation and speed of rotation of the second motor, and a speed of the elongated percutaneous device along its longitudinal axis is determined by the direction of rotation and speed of the first motor and the rotation direction and rotational speed of the second motor.

3. The apparatus of claim 2, wherein the elongated percutaneous device is moved in a first direction along the longitudinal axis of the percutaneous device when the direction of rotation of the first motor and the second motor are in a first direction and the speed of the first motor and the second motor are the same.

4. The apparatus of claim 3, wherein the elongated percutaneous device is moved in a second direction opposite the first direction along the longitudinal axis of the percutaneous device when the direction of rotation of the output of the first motor and the second motor are in a second direction opposite the first direction and the speed of the first motor and the second motor are the same.

5. The apparatus of claim 4, wherein the elongated percutaneous device is rotated in a first direction about the longitudinal axis of the percutaneous device when the direction of rotation of the output of the first motor is in the first direction and the direction of rotation of the output of the second motor in in the second direction and the speed of the first motor and the speed of the second motor are the same.

6. The apparatus of claim 5, wherein the elongated percutaneous device is rotated in a second direction about the longitudinal axis of the percutaneous device when the direction of rotation of the output of the first motor is in the second direction and the direction of rotation of the output of the second motor in in the first direction and the speed of the first motor and the speed of the second motor are the same.

7. The apparatus of claim 6, wherein the elongated percutaneous device is both rotated about the longitudinal axis of the percutaneous device and moved in along the longitudinal axis of the percutaneous device when the speed of the first motor is different than the speed of the second motor.

8. The apparatus of claim 1, wherein the elongated percutaneous device is both rotated about the longitudinal axis of the percutaneous device and moved in along the longitudinal axis of the percutaneous device when the speed of the first motor is different than the speed of the second motor.

9. The apparatus of claim 1, wherein the drive mechanism includes a second drive member and a second corresponding driven member operatively biased toward the second driven member, the second drive member operatively connected to the first motor, the second motor and the first drive member.

10. The apparatus of claim 9, wherein the unitary platform includes a first side and an opposing second side, the driven member to be rotatably positioned on the first side and the gear chain operatively connecting the drive members with the first motor and the second motor operatively positioned adjacent the second side of the unitary platform.

11. The apparatus of claim 1, wherein the first motor is operatively connected to the gear chain proximate a first end portion of the unitary platform and the second motor is operatively connected to the gear chain proximate a second end portion of the unitary platform.

12. The apparatus of claim 11, wherein the support include a first journal and a second journal each having a slot provided in the longitudinal direction of the drive mechanism, the slots providing the elongated percutaneous device to lay in a straight line and to permit placement of the elongated percutaneous device within the drive mechanism in a direction perpendicular to an axis that is co-linear with an elongated axis of the elongated percutaneous device when the elongated percutaneous device is within the drive mechanism.

13. The apparatus of claim 12, wherein the elongated percutaneous device is a guide wire.

14. The apparatus of claim 1, wherein the elongated percutaneous device is an ablation catheter.

15. The apparatus of claim 1, wherein the elongated percutaneous device is a balloon stent catheter.

16. The apparatus of claim 1, further including a remote control station being positioned remote from the drive mechanism including a first user input device to provide linear movement of the elongated percutaneous device along the longitudinal axis of the elongated percutaneous device and a second user input to provide rotation movement of the elongated percutaneous device about the longitudinal axis of the elongated percutaneous device, the remote control station including a controller providing electronic instructions to the first motor to rotate at a first speed and a first direction and providing electronic instructions to the second motor to rotate at a second speed and a second direction.

* * * * *